US012033240B2

(12) United States Patent
Palangie et al.

(10) Patent No.: US 12,033,240 B2
(45) Date of Patent: Jul. 9, 2024

(54) METHOD AND DEVICE FOR RESOLVING FOCAL CONFLICT

(71) Applicant: Apple Inc., Cupertino, CA (US)

(72) Inventors: Alexis Henri Palangie, Palo Alto, CA (US); Shih Sang Chiu, San Francisco, CA (US); Bruno M. Sommer, Sunnyvale, CA (US); Connor Alexander Smith, San Mateo, CA (US); Aaron Mackay Burns, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 295 days.

(21) Appl. No.: 16/909,620

(22) Filed: Jun. 23, 2020

(65) Prior Publication Data

US 2021/0097729 A1    Apr. 1, 2021

Related U.S. Application Data

(60) Provisional application No. 62/906,929, filed on Sep. 27, 2019.

(51) Int. Cl.
| | |
|---|---|
| *G06T 19/00* | (2011.01) |
| *G06T 5/20* | (2006.01) |
| *G06T 5/70* | (2024.01) |
| *G06T 11/00* | (2006.01) |

(52) U.S. Cl.
CPC .............. *G06T 11/00* (2013.01); *G06T 5/20* (2013.01); *G06T 5/70* (2024.01); *G06T 19/006* (2013.01)

(58) Field of Classification Search
None
See application file for complete search history.

(56) References Cited

U.S. PATENT DOCUMENTS

| | | | |
|---|---|---|---|
| 9,690,374 B2 | 6/2017 | Clement et al. | |
| 2015/0091780 A1* | 4/2015 | Lyren .................. | G02B 27/017 345/8 |
| 2016/0307374 A1 | 10/2016 | Kurz et al. | |

(Continued)

OTHER PUBLICATIONS

Ilyas Hamadouche, "Augmented Reality X-Ray Vision on Optical See-Through Head-Mounted Displays", Master's Thesis, Degree Programme in Comupter Science and Engineering, University of Oulu, Jun. 2018, pp. 1-62.

*Primary Examiner* — Matthew Salvucci
(74) *Attorney, Agent, or Firm* — Fernando & Partners, LLP

(57) ABSTRACT

In one implementation, a method of resolving focal conflict in a computer-generated reality (CGR) environment is performed by a device including a processor, non-transitory memory, an image sensor, and a display. The method includes capturing, using the image sensor, an image of a scene including a real object in a particular direction at a first distance from the device. The method includes displaying, on the display, a CGR environment including a virtual object in the particular direction at a second distance from the device. In accordance with a determination that the second distance is less than the first distance, the CGR environment includes the virtual object overlaid on the scene. In accordance with a determination that the second distance is greater than the first distance, the CGR environment includes the virtual object with an obfuscation area that obfuscates at least a portion of the real object within the obfuscation area.

20 Claims, 11 Drawing Sheets

(56) References Cited

U.S. PATENT DOCUMENTS

| | | |
|---|---|---|
| 2017/0053042 A1 | 2/2017 | Sugden et al. |
| 2017/0256096 A1 | 9/2017 | Faaborg et al. |
| 2019/0221043 A1 | 7/2019 | Kopper et al. |
| 2019/0230297 A1 | 7/2019 | Knorr et al. |
| 2020/0082629 A1* | 3/2020 | Jones .................. G02B 27/017 |
| 2020/0184653 A1* | 6/2020 | Faulkner ................ G06F 3/011 |

* cited by examiner

500

At a device including one or more processors, non-transitory memory, an image sensor, and a display:

Capturing, using the image sensor, an image of a scene including a real object in a particular direction at a first distance from the device  ⸺510

Displaying, on the display, a computer-generated reality (CGR) environment including a virtual object in the particular direction at a second distance from the device  ⸺520

In accordance with a determination that the second distance is less than the first distance, the CGR environment includes the virtual object overlaid on the scene  ⸺521

In accordance with a determination that the second distance is greater than the first distance, the CGR environment includes the virtual object with an obfuscation area that obfuscates at least a portion of the real object within the obfuscation area.  ⸺522

Figure 5

METHOD AND DEVICE FOR RESOLVING FOCAL CONFLICT

CROSS-REFERENCE TO RELATED APPLICATIONS

This application claims priority to U.S. Provisional Patent App. No. 62/906,929, filed on Sep. 27, 2019, which is hereby incorporated by reference in its entirety.

TECHNICAL FIELD

The present disclosure generally systems, methods, and devices for resolving focal conflict between real objects and virtual objects.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of Mixed Realities Include Augmented Reality and Augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a CGR environment includes one or more real objects and one or more virtual objects. In various implementations, a virtual object is rendered at a distance that places the virtual object behind a real object without being occluded by the real object. This creates a focal conflict in which the user sees the virtual object and gets depth cues as if the virtual object were further than the real object and, thus, should be occluded by the physical object, but is not. It may be desirable to effectively resolve this focal conflict.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of resolving focal conflict in accordance with some implementations.

Figure 1:
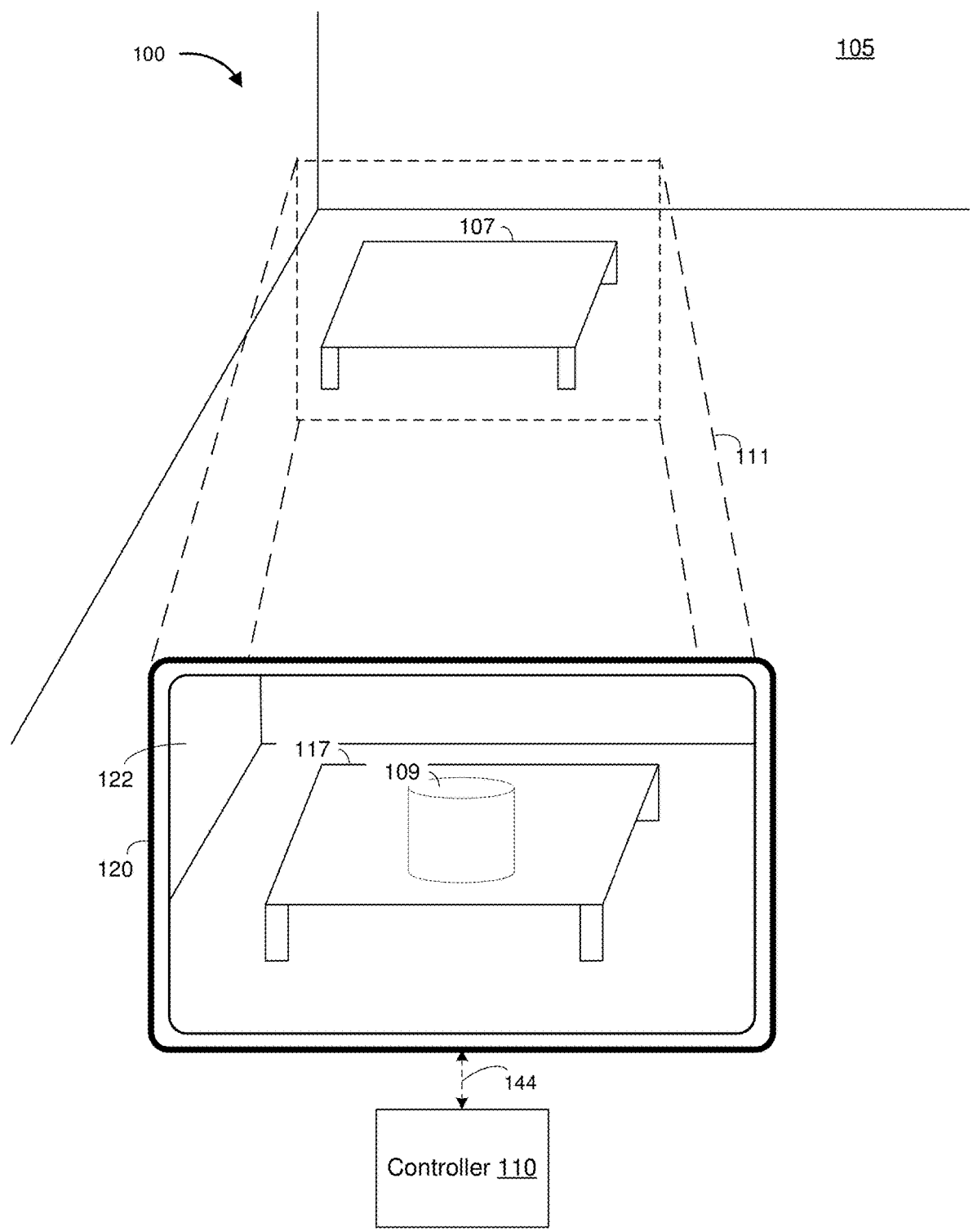
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for resolving focal conflict in a computer-generated reality (CGR) environment. In various implementations, a method is performed at a device including a processor, non-transitory memory, an image sensor, and a display. The method includes capturing, using the image sensor, an image of a scene including a real object in a particular direction at a first distance. The method includes displaying, on the display, a computer-generated reality (CGR) environment including a virtual object in the particular direction at a second distance from the device. In accordance with a determination that the second distance is less than the first distance, the CGR environment includes the virtual object overlaid on the scene. In accordance with a determination that the second distance is greater than the first distance, the CGR environment includes the virtual object with an obfuscation area.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Various CGR environments include both real objects and virtual objects. When a virtual object is rendered at a distance further than the distance to a real object, there is a focal conflict. A user may be disoriented or disconcerted by seeing a virtual object that should be occluded by a real object. For example, while a user is seated on a bus or airplane, there is a short distance between the user and the seat in front of them. However, a user may wish to view virtual content at distances greater than that short distance without focal conflict. Similarly, while seated at a desk with a computer monitor a short distance away, a user may wish to view virtual content at distances greater than that short distance without focal conflict. Accordingly, in various implementations, the virtual content is displayed at greater distances with the focal conflict resolved by way of an obfuscation area with the virtual content (e.g., surrounding the virtual content). The obfuscation area blurs, dims, and/or occludes the portion of the real object in the obfuscation area.

As another example, in various implementations, a CGR environment includes a first real environment where the user is located and an avatar representing a person in a second real environment remote from the first real environment. Thus, the CGR environment allows interaction between the user and the person (by means of the avatar). When the person moves within the second real environment, the avatar moves correspondingly in the CGR environment. In various implementations, the second real environment may be larger than the first real environment and as the person moves within the second real environment, the avatar moves to distances greater than that to a wall of the first real environment. Rather than occluding the avatar and hindering interaction between the user and the person, the CGR environment displays the avatar with an obfuscation area, e.g., surrounding the avatar.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the CGR experience to the user. In some implementations, the electronic device 120 includes a suitable combination of software, firmware, and/or hardware. According to some implementations, the electronic device 120 presents, via a display 122, CGR content to the user while the user is physically present within the scene 105 that includes a table 107 within the field-of-view 111 of the electronic device 120. As such, in some implementations, the user holds the electronic device 120 in his/her hand(s). In some implementations, while providing augmented reality (AR) content, the electronic device 120 is configured to display an AR object (e.g., an AR cylinder 109) and to enable video pass-through of the scene 105 (e.g., including a representation 117 of the table 107) on a display 122. The electronic device 120 is described in greater detail below with respect to FIG. 3.

According to some implementations, the electronic device 120 provides a CGR experience to the user while the user is virtually and/or physically present within the scene 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more CGR displays provided to display the CGR content. For example, in various implementations, the electronic device 120 encloses the field-of-view of the user. In some implementations, the electronic device 120 is a handheld device (such as a smartphone or tablet) configured to present CGR content, and rather than wearing the electronic device 120, the user holds the device with a display directed towards the field-of-view of the user and a camera directed towards the scene 105. In some implementations, the handheld device can be placed within an enclosure that can be worn on the head of the user. In some implementations, the electronic device 120 is replaced with a CGR chamber, enclosure, or room configured to present CGR content in which the user does not wear or hold the electronic device 120.

Figure 2:
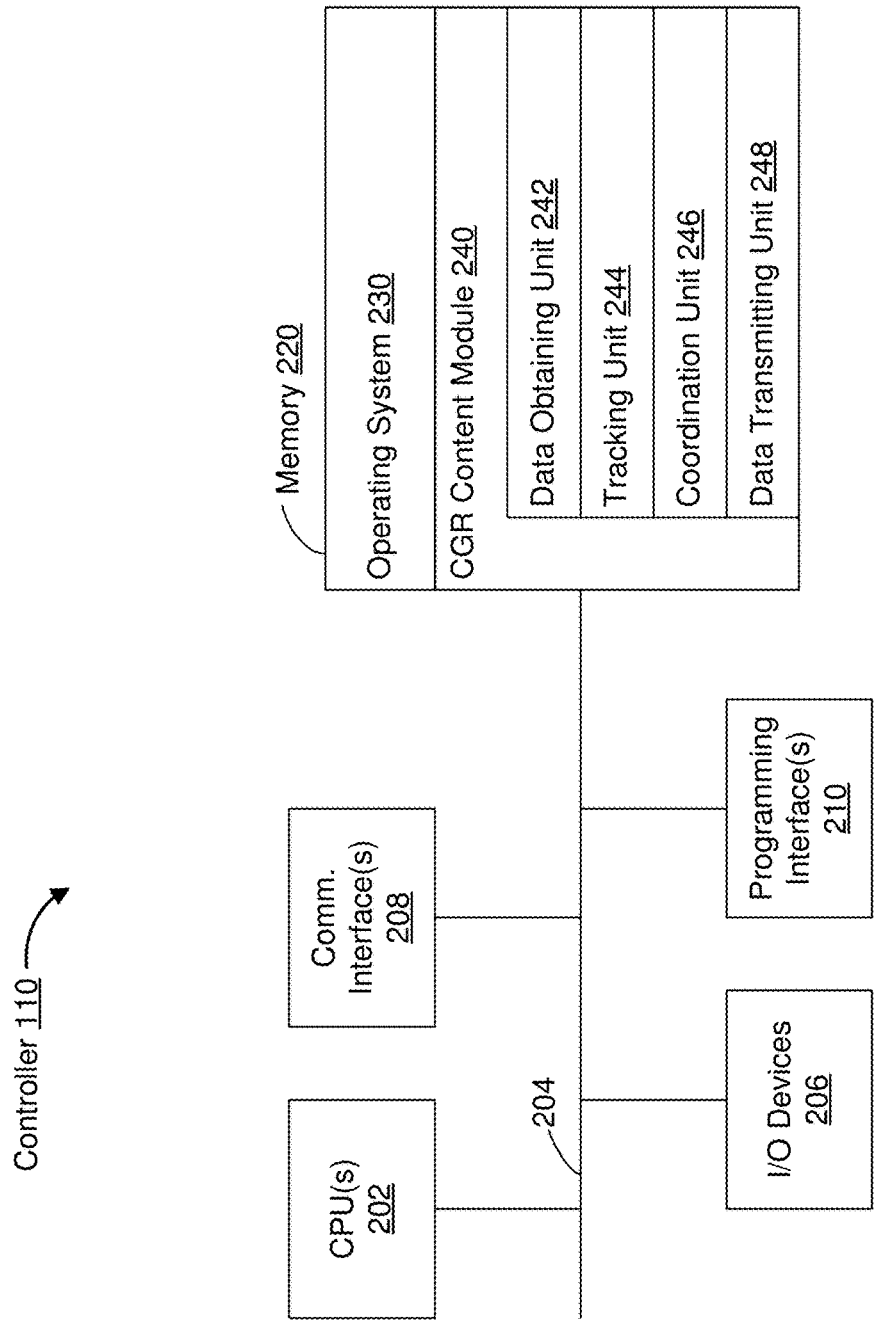
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR content module 240.

The operating system 230 includes procedures for handling various basic system services and for performing hardware dependent tasks. In some implementations, the CGR content module 240 is configured to manage and coordinate presentation of CGR content for one or more users (e.g., a single set of CGR content for one or more users, or multiple sets of CGR content for respective groups of one or more users). To that end, in various implementations, the CGR content module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the scene 105 and to track the position/location of at least the electronic device 120 with respect to the scene 105 of FIG. 1. To that end, in various implementations, the tracking unit 244 includes instructions and/or logic therefor, and heuristics and metadata therefor.

In some implementations, the coordination unit 246 is configured to manage and coordinate the presentation of CGR content to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
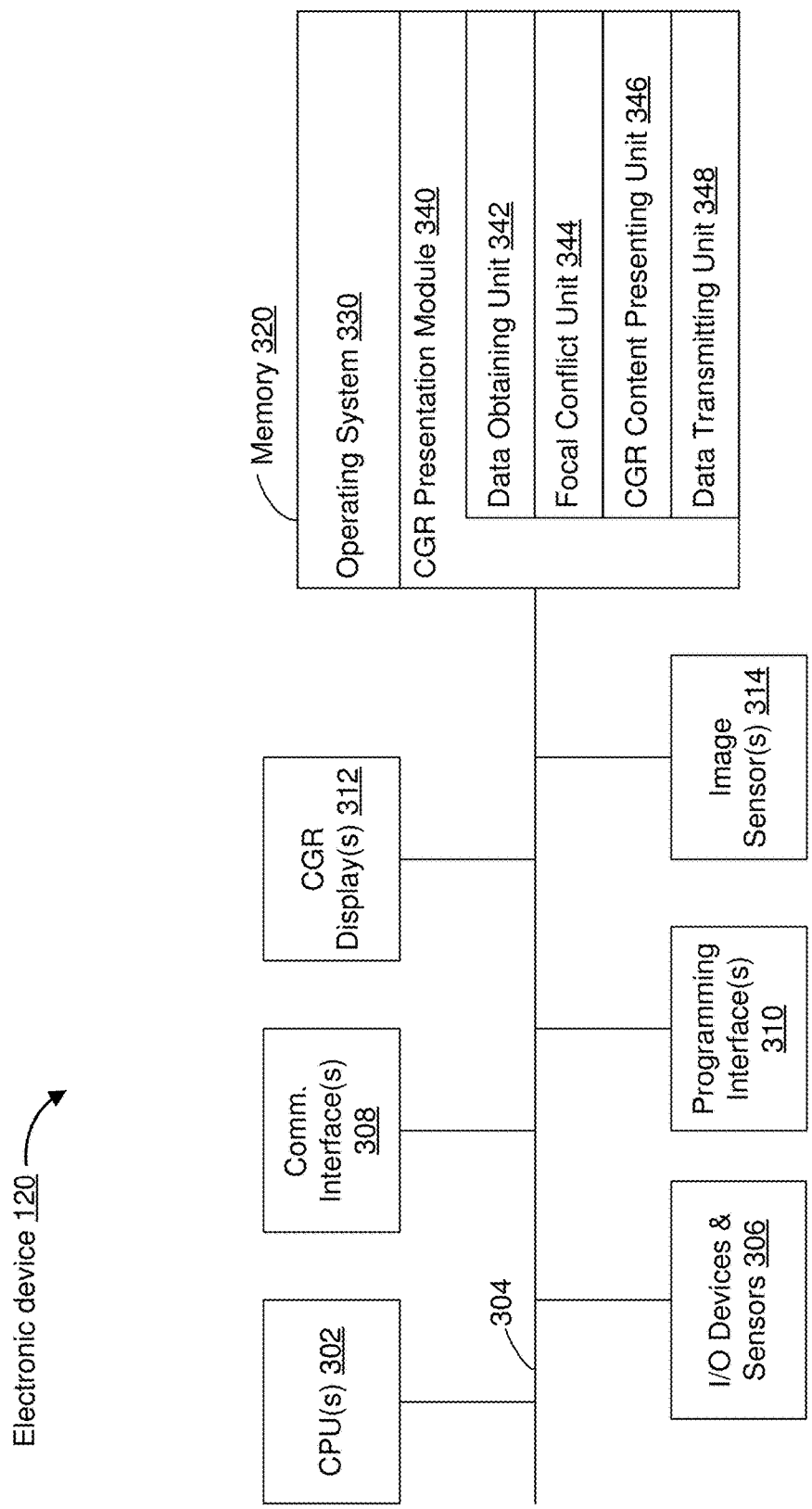
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more microphones, one or more speakers, one or more biometric sensors (e.g., blood pressure monitor, heart rate monitor, breathing monitor, electrodermal monitor, blood oxygen sensor, blood glucose sensor, etc.), a haptics engine, one or more depth sensors (e.g., a structured light, a time-of-flight, or the like), and/or the like.

In some implementations, the one or more CGR displays 312 are configured to display CGR content to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the electronic device 120 includes a single CGR display. In another example, the electronic device 120 includes a CGR display for each eye of the user. In some implementations, the one or more CGR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312 and/or the I/O devices and sensors 306 (such as the one or more speakers). To that end, in various implementations, the CGR presentation module 340 includes a data obtaining unit 342, a focal conflict unit 344, a CGR content presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. In various implementations, the data obtaining unit 342 is configured to obtain data from the I/O devices and sensors 306. To that end, in various implementations, the data obtaining unit 342 includes instructions and/or logic therefor, and heuristics and metadata therefor.

In some implementations, the focal conflict unit 344 is configured to detect and resolve focal conflicts in a CGR environment. To that end, in various implementations, the focal conflict unit 344 includes instructions and/or logic therefor, and heuristics and metadata therefor.

In some implementations, the CGR content presenting unit 346 is configured to present CGR content to a user. In various implementations, the CGR content presenting unit 346 controls the one or more CGR displays 312 to display an obfuscation area around a virtual object at a further distance than a real object. To that end, in various implementations, the CGR content presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the focal conflict unit 344, the CGR content presenting unit 346, and the data transmitting unit 348 are shown as residing on a single device (e.g., the electronic device 120 of FIG. 1), it should be understood that in other implementations, any combination of the data obtaining unit 342, the focal conflict unit 344, the CGR content presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
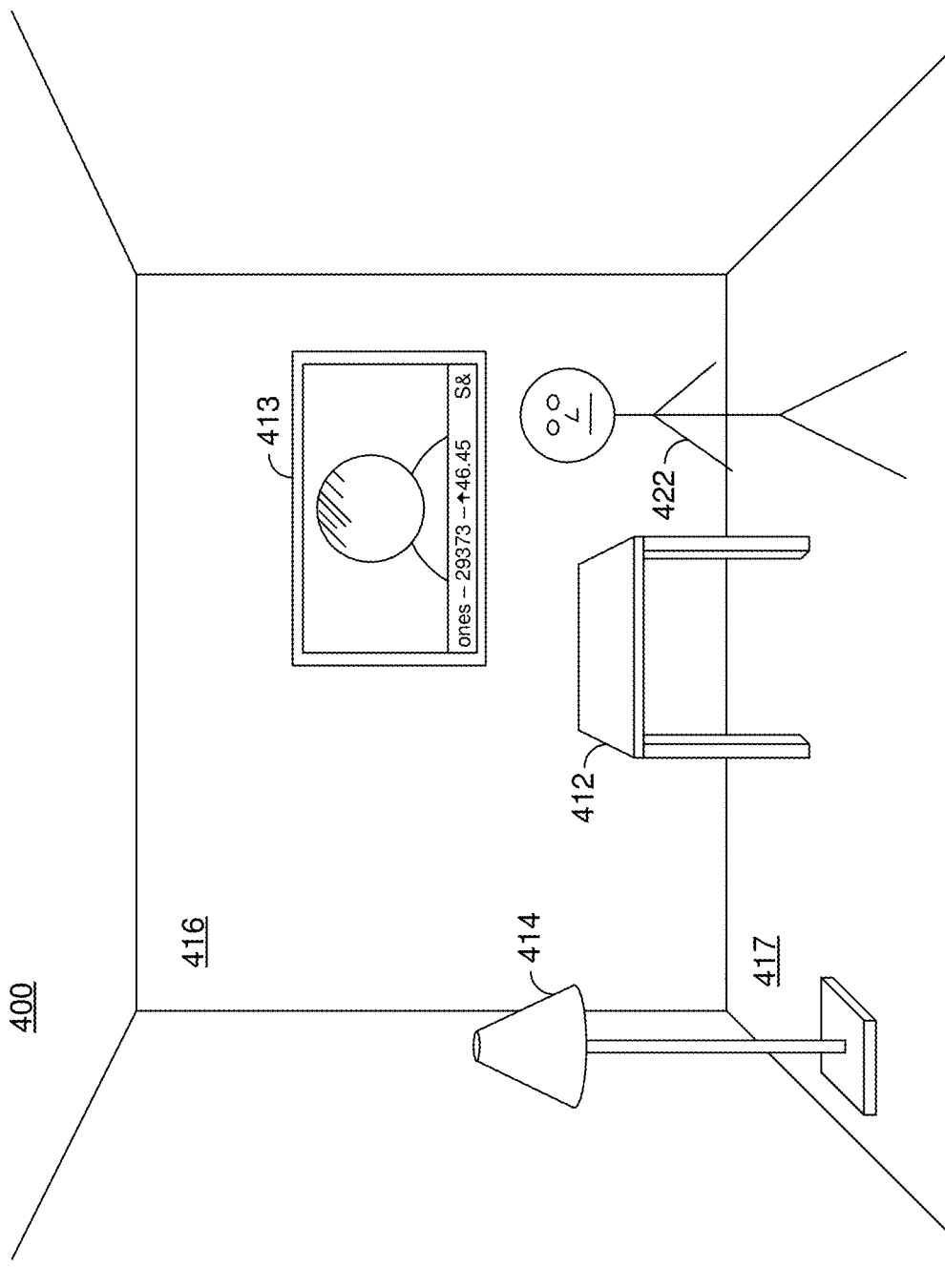
FIGS. 4A-4G illustrate a CGR environment based on a real environment surveyed by a scene camera of a device in accordance with various implementations.

FIG. 4A illustrates a CGR environment 400 based on a real environment surveyed by a scene camera of a device at a first time. In various implementations, the scene camera is part of a device that is worn by the user and includes a display that displays the first CGR environment 400. Thus, in various implementations, the user is physically present in the environment. In various implementations, the scene camera is part of remote device (such as a drone or robotic avatar) that transmits images from the scene camera to a local device that is worn by the user and includes a display that displays the CGR environment 400.

The CGR environment 400 includes a plurality of objects, including one or more real objects (e.g., a table 412, a television 413, a lamp 414, a wall 416, and a floor 417) and one or more virtual objects (e.g., an avatar 422). In various implementations, each object is displayed at a location in the first CGR environment 400, e.g., at a location defined by three coordinates in a three-dimensional (3D) CGR coordinate system. Accordingly, when the user moves in the CGR environment 400 (e.g., changes either position and/or orientation), the objects are moved on the display of the electronic device but retain their location in the CGR environment 400. In various implementations, certain virtual objects are displayed at locations on the display such that when the user moves in the CGR environment 400, the objects are stationary on the display on the electronic device.

In various implementations, the avatar 422 represents a person remote from the real environment (e.g., in a second real environment). When the person moves within the second real environment, the avatar 422 moves correspondingly in the CGR environment 400.

At the first time, the avatar 422 is displayed at a first position in front of the wall 416. The distance, in a particular direction from the scene camera, to the avatar 422 is less than the distance, in the particular direction from the scene camera, to the wall 416. Accordingly, there is no focal conflict.

Figure 4B:
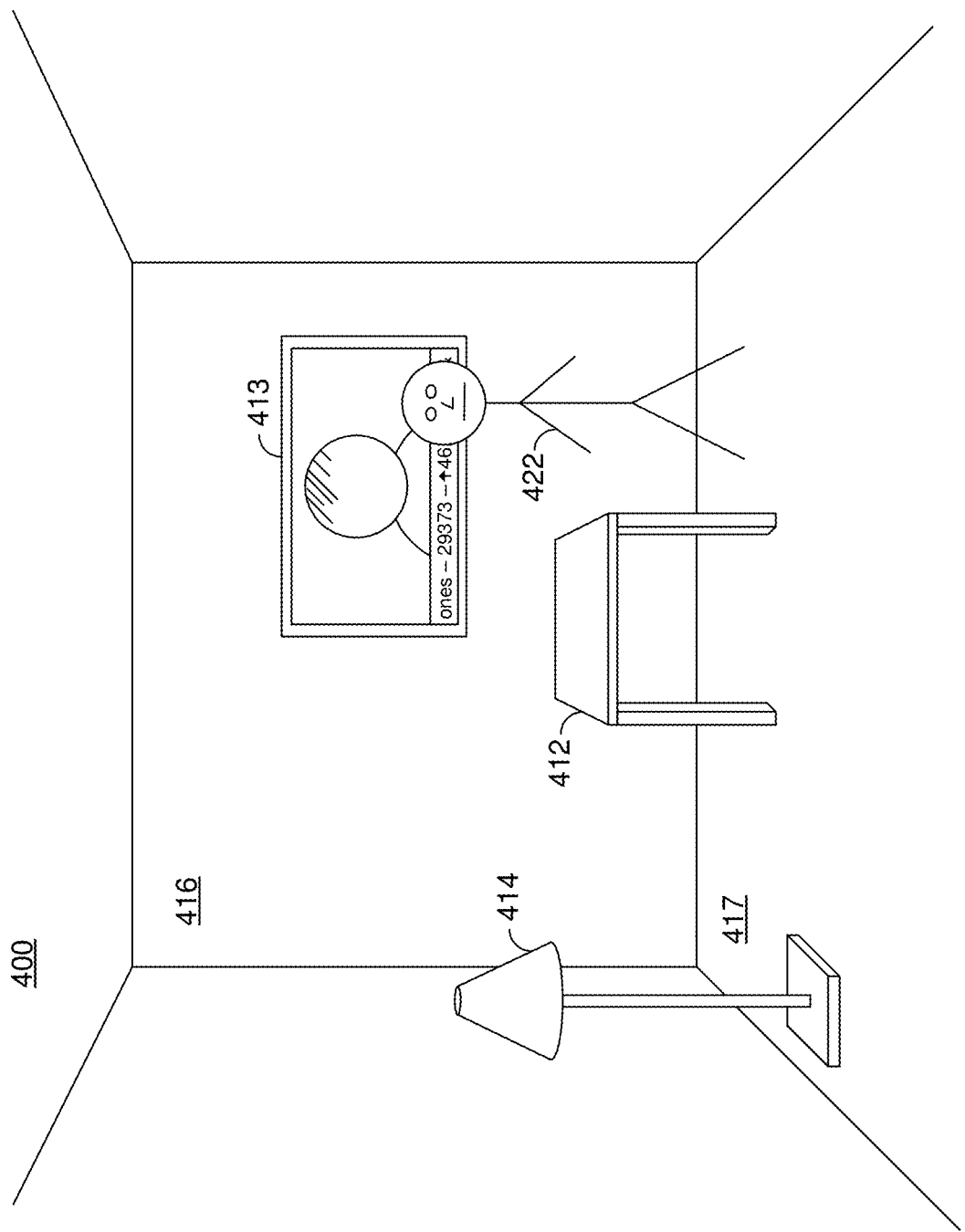

FIG. 4B illustrates the CGR environment 400 of FIG. 4A at a second time. At the second time, the avatar 422 is displayed at a second position closer to, but still in front of, the wall 416 (and the television 413). In various implementations, the avatar 422 is moved in response to the person represented by the avatar 422 moving within the second real environment. The distance, in a particular direction from the scene camera, to the avatar 422 is greater than in FIG. 4A. Thus, the avatar 422 as illustrated in FIG. 4B is smaller than the avatar 422 as illustrated in FIG. 4A. However, the distance, in the particular direction from the scene camera, to the avatar 422 is still less than the distance, in the particular direction from the scene camera, to the wall 416. Accordingly, there is no focal conflict.

Figure 4C:
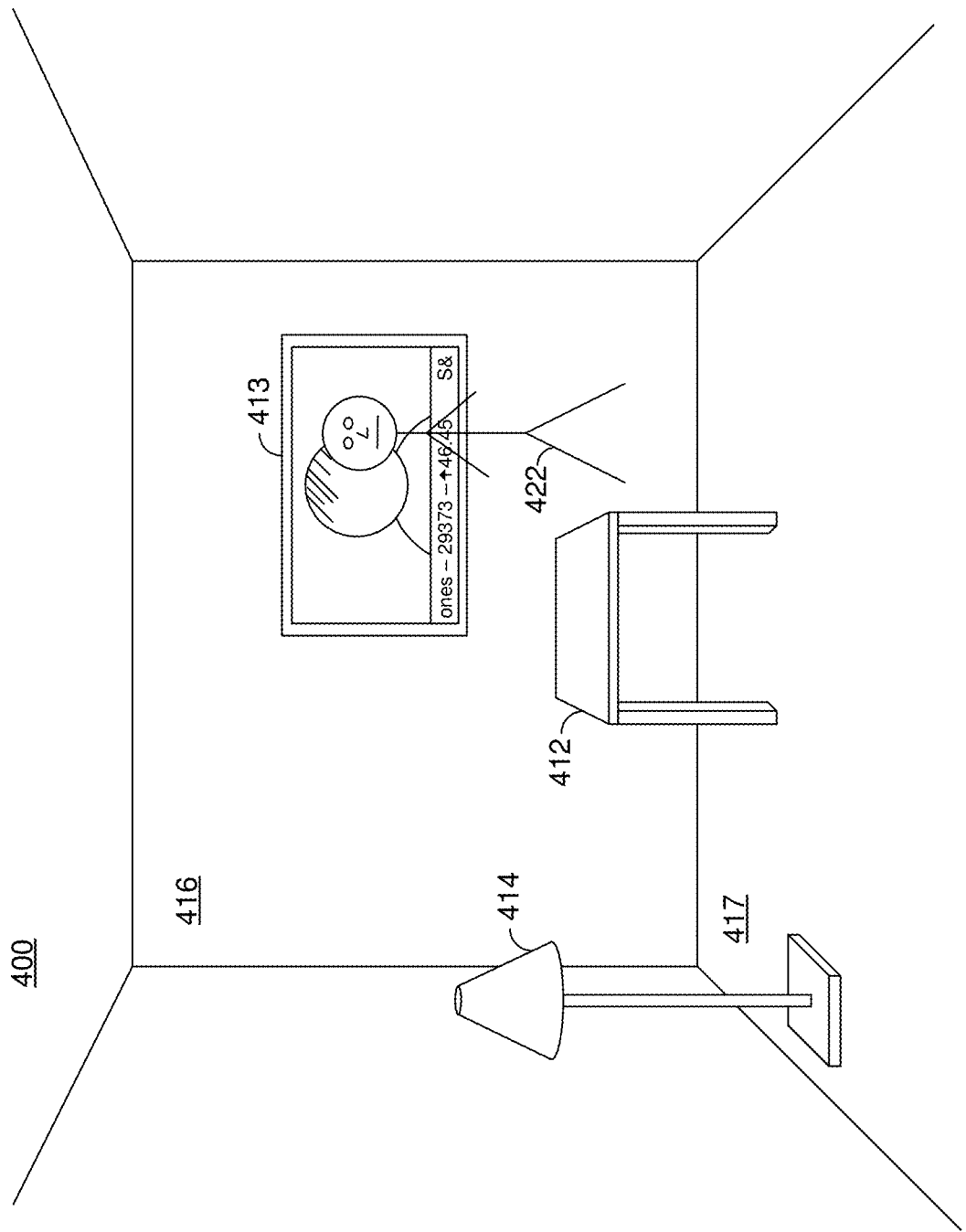

FIG. 4C illustrates the CGR environment 400 of FIG. 4A at a third time. At the third time, the avatar 422 is displayed at a third position further from the scene camera and behind the wall 416 (and the television 413). In various implementations, the avatar 422 is moved in response to the person represented by the avatar 422 moving within the second real environment. The distance, in a particular direction from the scene camera, to the avatar 422 is greater than in FIG. 4B. Thus, the avatar 422 as illustrated in FIG. 4C is smaller than the avatar 422 as illustrated in FIG. 4B. Further, the distance, in the particular direction from the scene camera, to the avatar 422 is greater than the distance, in the particular direction from the scene camera, to the wall 416. Accordingly, there is a focal conflict.

A user receives a depth cue indicating that the avatar 422 is at a particular distance further than the distance to the wall 416. For example, the user can determine the distance to the avatar 422 by parallax deduction based on different views of two eyes or based on different views obtained by moving within the real environment. The user can determine the distance to the avatar 422 by noting that the avatar 422 has shrunk in size as it moves from the first position to the second position to the third position.

Because the distance to the avatar 422 is greater than the distance to the wall 416, were the avatar 422 a real object, it would be occluded by the wall 416. A user may find it disorienting or disconcerting that the avatar 422 should be occluded, but is clearly visible.

Figure 4D:
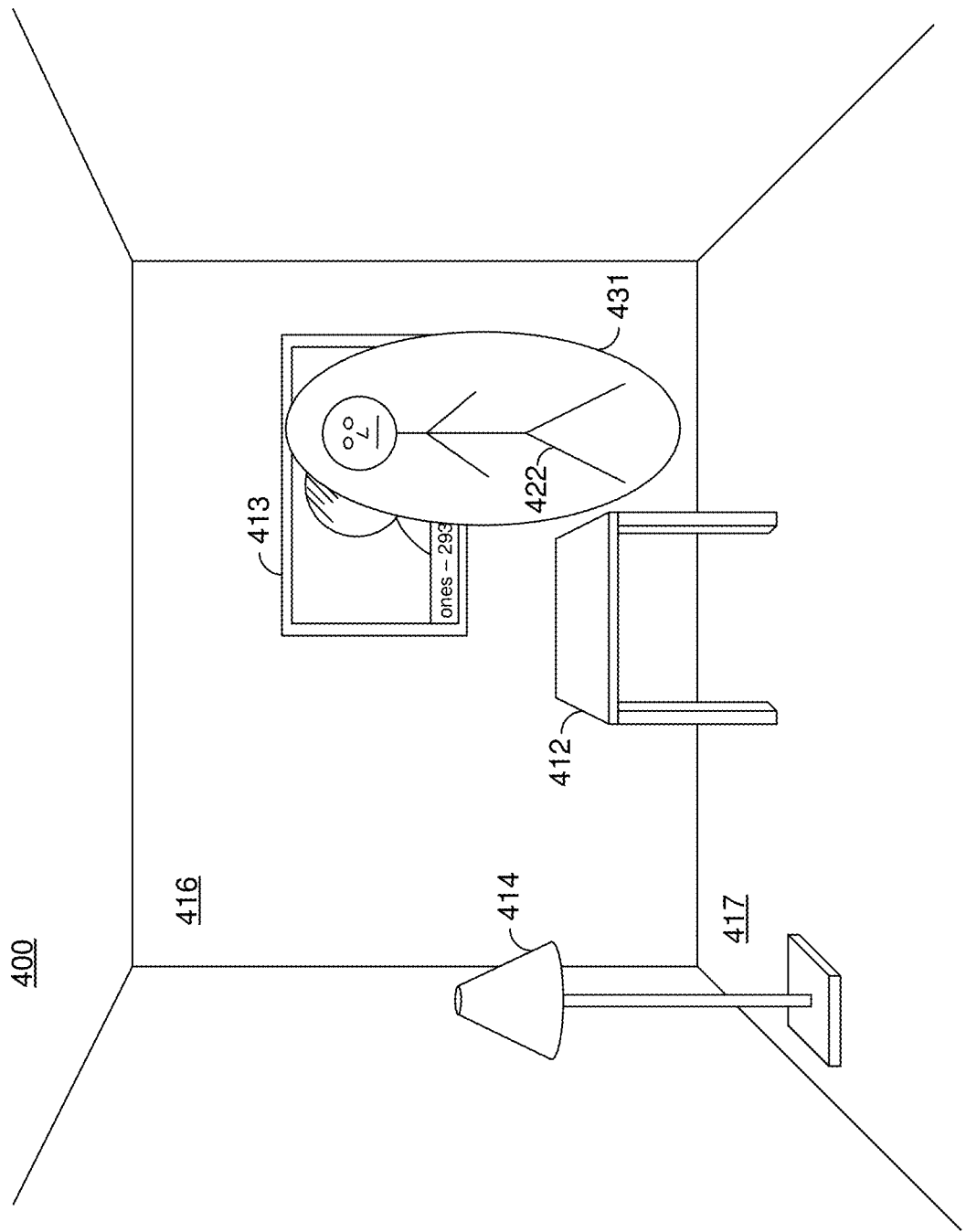

FIG. 4D illustrates the CGR environment 400 of FIG. 4A at the third time with a first focal conflict resolution. At the third time, the avatar 422 is displayed at the third position behind the wall 416. In response to a determination that the distance to the avatar 422 is greater than the distance to the wall 416, the CGR environment 400 includes a masking region 431 with the avatar 422 which partially occludes the wall 416 and the television 413. In FIG. 4D, the masking region 431 is a white oval surrounding the avatar 422. In various implementations, the masking region 431 is white, black, or any other color. In various implementations, the masking region 431 is an oval, a rectangle, or any other shape. In various implementations, the masking region 431 is the same shape as, but larger than, the avatar 422, resulting in a masking halo surrounding the avatar 422. In various implementations, the size of the masking region 431 is proportional to (and larger than) the size of the avatar 422. For example, in various implementations, the masking region 431 is 1.25 times as large, 1.5 times as large, 2 times as large, or 3 times as large as the avatar 422 (in either area, or any particular dimension).

Figure 4E:
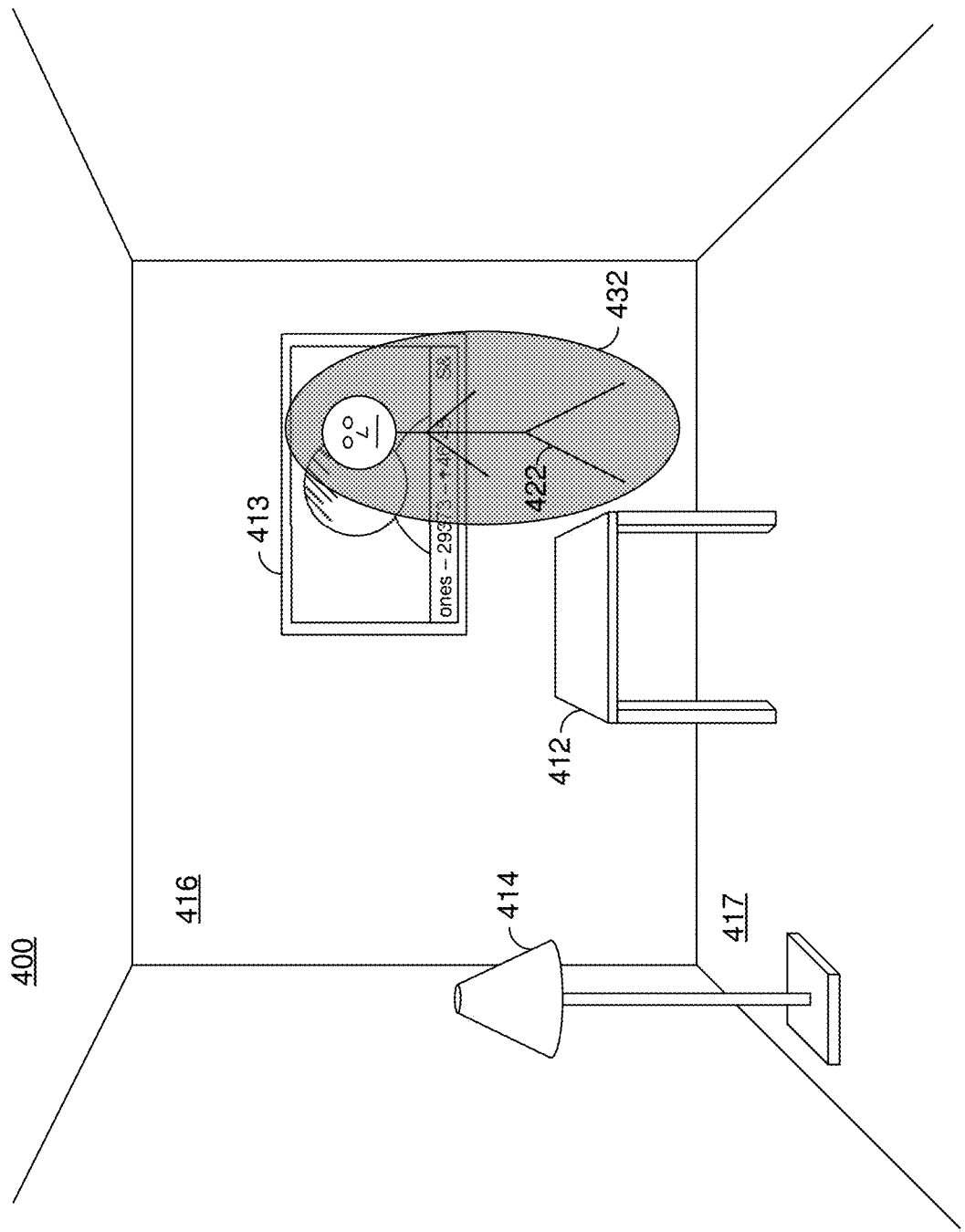

FIG. 4E illustrates the CGR environment 400 of FIG. 4A at the third time with a second focal conflict resolution. At the third time, the avatar 422 is displayed at the third position behind the wall 416. In response to a determination that the distance to the avatar 422 is greater than the distance to the wall 416, the CGR environment 400 includes a blurring region 432 with the avatar 422 which partially blurs the wall 416 and the television 413. Thus, in the area proximate to the avatar 422, the wall 416 and the television 413 are blurred. However, in various implementations, the avatar 422 is not blurred.

In FIG. 4E, the blurring region 431 is an oval surrounding the avatar 422. In various implementations, the blurring region 431 is an oval, a rectangle, or any other shape. In various implementations, the blurring region 431 is the same shape as, but larger than, the avatar 422, resulting in a blurring halo surrounding the avatar 422. In various implementations, the size of the blurring region 431 is proportional to (and larger than) the size of the avatar 422. For example, in various implementations, the blurring region 431 is 1.25 times as large, 1.5 times as large, 2 times as large, or 3 times as large as the avatar 422 (in either area, or any particular dimension). In various implementations, the blurring region 431 occupies the entire CGR environment 400 (excluding the avatar 422).

In various implementations, the blurring region 431 is also a dimming region that dims the area proximate to the avatar 422 such that in the area surrounding the avatar 422, the wall 416 and the television 413 are blurred and dimmed In various implementations, the avatar 422 is neither blurred nor dimmed.

In various implementations, the blurring region 431 is replaced with a dimming region with the avatar 422 such that in the area proximate to the avatar 422, the wall 416 and the television 413 are dimmed, but not blurred. In various implementations, the avatar 422 is not dimmed.

Figure 4F:
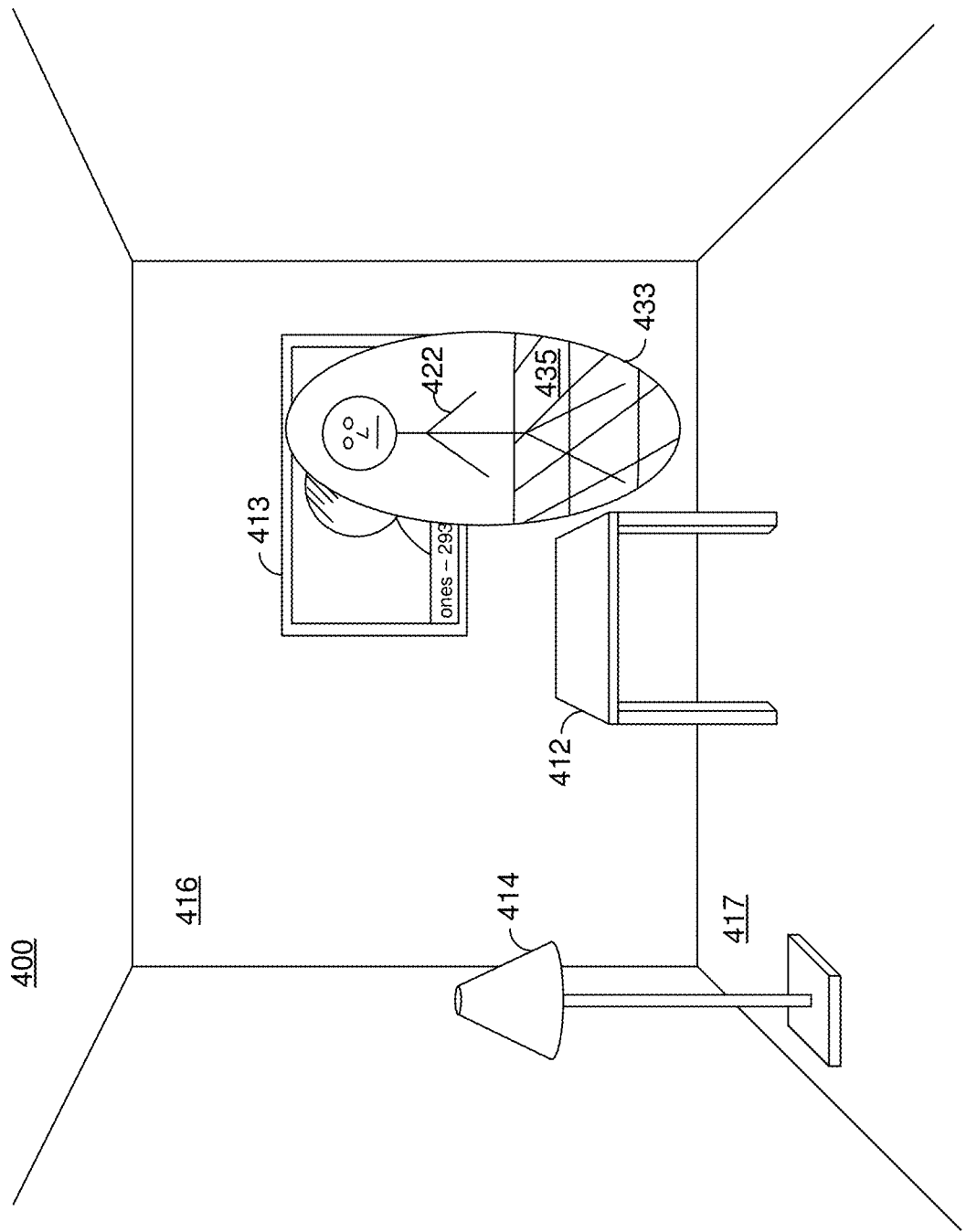

FIG. 4F illustrates the CGR environment 400 of FIG. 4A at the third time with a third focal conflict resolution. At the third time, the avatar 422 is displayed at the third position behind the wall 416. In response to a determination that the distance to the avatar 422 is greater than the distance to the wall 416, the CGR environment 400 includes a portal region 433 with the avatar 422 which partially occludes the wall 416 and the television 413. Thus, in the area proximate to the avatar 422, the wall 416 and the television 413 cannot be seen. Rather, in the portal region 433, a virtual world is displayed including the avatar 422. In various implementations, the virtual world includes a virtual floor 435 in the same plane as the real floor 417. In various implementations, the virtual floor 435 is displayed as a grid. In various implementations, a virtual shadow of the avatar 422 is displayed on the virtual floor 435.

In FIG. 4F, the portal region 433 is an oval surrounding the avatar 422. In various implementations, the portal region 433 is an oval, a rectangle, or any other shape. In various implementations, the portal region 433 includes a halo effect at the outer edge of the portal region 433. In various implementations, the size of the portal region 433 is proportional to (and larger than) the size of the avatar 422. For example, in various implementations, the portal region 433 is 1.25 times as large, 1.5 times as large, 2 times as large, or 3 times as large as the avatar 422 (in either area, or any particular dimension).

Figure 4G:
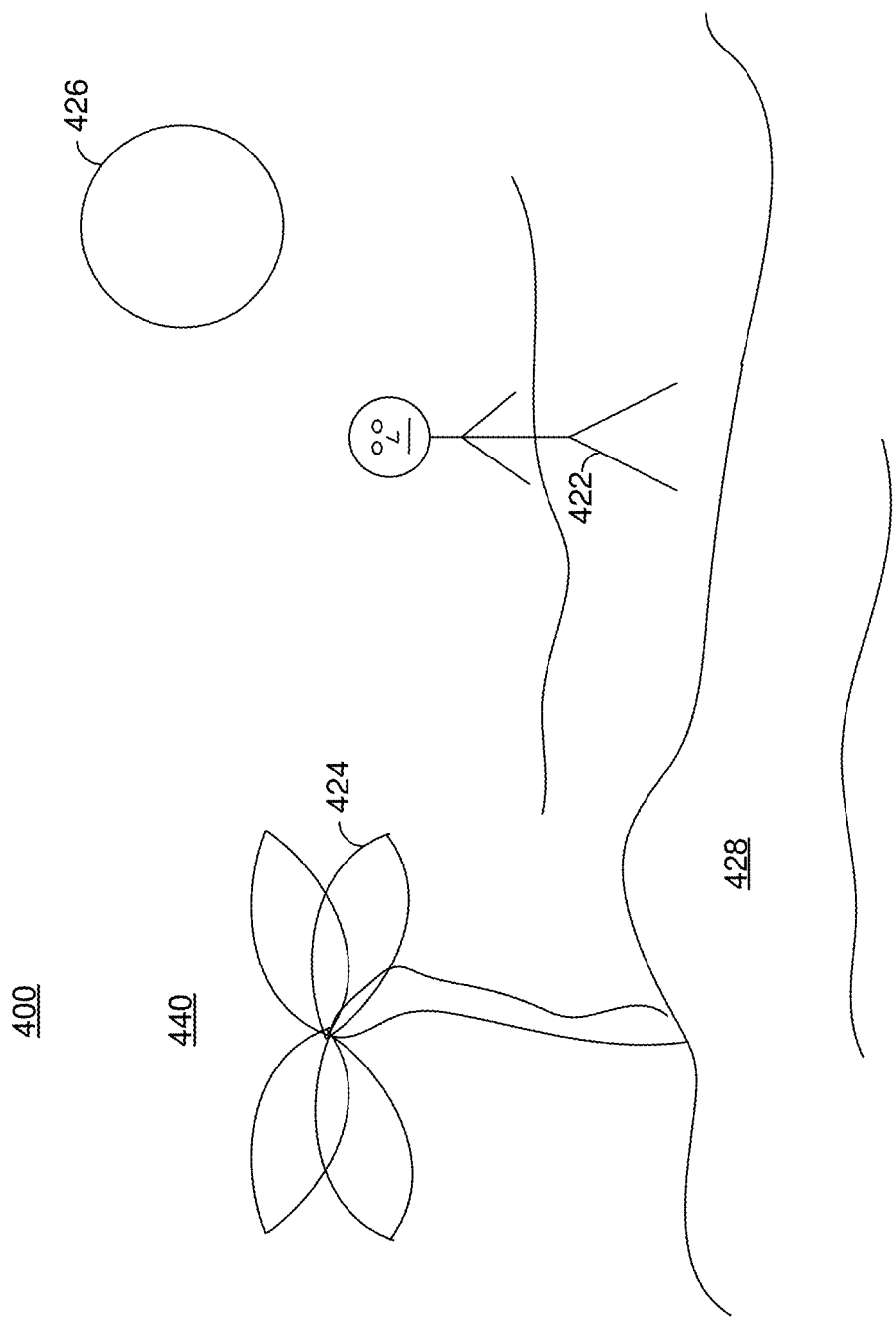

FIG. 4G illustrates the CGR environment 400 of FIG. 4A at the third time with a fourth focal conflict resolution. At the fourth time, the avatar 422 is displayed at the third position behind the wall 416. In response to a determination that the distance to the avatar 422 is greater than the distance to the wall 416, the CGR environment 400 includes a virtual world 440 overlaid over the entire scene, occluding all the real objects of the CGR environment 400. In various implementations, the virtual world 440 includes representations of certain real objects (e.g., the table 412 and the lamp 414) while excluding representations of other real objects (e.g., the wall 416 and the floor 417).

The virtual world 440 includes the avatar 422 at the third position, a virtual ground 428, a virtual tree 424, and a virtual sun 426. In various implementations, the virtual world 440 includes a virtual shadow of the avatar 422 displayed on the virtual ground 428.

FIG. 5 is a flowchart representation of a method 500 of resolving focal conflict in a CGR environment in accordance with some implementations. In various implementations, the method 500 is performed by a device with one or more processors, non-transitory memory, an image sensor, and a display (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device capturing, using the image sensor, an image of a scene including a real object in a particular direction at a first distance. For example, in FIG. 4A, the wall 416 is, in a particular direction, at a distance from the scene camera.

The method 500 continues, in block 520, with the device displaying, on the display, a CGR environment including a virtual object in the particular direction at a second distance from the device. For example, in FIG. 4A, the avatar 422 is displayed at a first position, at a distance from the scene camera in the particular direction. As another example, in FIG. 4D, the avatar 422 is displayed at a third position, at a distance from the scene camera in the particular direction.

In block 521, in accordance with a determination that the second distance is less than the first distance, the CGR environment includes the virtual object overlaid on the scene. For example, in FIG. 4A, in accordance with a determination that the distance to the avatar 422 is less than the distance to the wall 416, the CGR environment 400 includes the avatar 422 displayed over the scene (including the wall 416). As another example, in FIG. 4B, in accordance with a determination that the distance to the avatar 422 is less than the distance to the wall 416, the CGR environment 400 includes the avatar 422 displayed over the scene (including the wall 416).

In block 522, in accordance with a determination that the second distance is greater than the first distance, the CGR environment includes the virtual object with an obfuscation area that obfuscates at least a portion of the real object within the obfuscation area. In various implementations, the obfuscation area surrounds the virtual object. For example, in FIG. 4D, in accordance with a determination that the distance to the avatar 422 is greater than the distance to the wall 416, the CGR environment 400 includes the avatar 422 surrounded by the masking region 431 that hides at least a portion of the wall 416. As another example, in FIG. 4E, in accordance with a determination that the distance to the avatar 422 is greater than the distance to the wall 416, the CGR environment 400 includes the avatar 422 surrounded by the blurring region 432 that blurs at least a portion of the wall 416. As another example, in FIG. 4F, in accordance with a determination that the distance to the avatar 422 is greater than the distance to the wall 416, the CGR environment 400 includes the avatar 422 surrounded by the portal region 433 that hides at least a portion of the wall 416. As another example, in FIG. 4F, in accordance with a determination that the distance to the avatar 422 is greater than the distance to the wall 416, the CGR environment 400 includes the avatar 422 surrounded by the virtual world 440 that hides the wall 416 (and all other real objects of the scene).

In various implementations, the obfuscation area includes a blurring region that blurs the portion of the real object within the blurring region. For example, in FIG. 4E, the avatar 422 is surrounded by the blurring region 432 that blurs the portion of the wall 416 (and the television 413) within the blurring region 432. In various implementations, the obfuscation area includes a dimming region dims the portion of the real object within the dimming region. In various implementations, the amount of blurring and/or dimming decreases further from the virtual object.

In various implementations, the obfuscation area includes a masking region that occludes the portion of the real object within the masking region. For example, in FIG. 4D, the avatar 422 is surrounded by the masking region 431 that occludes, covers, and hides the portion of the wall 416 (and the television 413) within the masking region 431.

In various implementations, the obfuscation area includes a portal region that displays a virtual world over the portion of the real object within the portal region. For example, in FIG. 4F, the avatar 422 is surrounded by the portal region 433 that displays a virtual world. In various implementations, the virtual world includes a virtual floor. For example, in FIG. 4F, the portal region 433 displays the virtual floor 435. In various implementations, the virtual floor is coplanar with a real floor of the scene. For example, in FIG. 4F, the virtual floor 435 is coplanar with the floor 417. In various implementations, the method 500 further includes displaying a virtual shadow of the virtual object on the virtual floor.

In various implementations, the obfuscation area occupies the entire display. For example, in FIG. 4G, the avatar 422 is surrounded by a virtual world 440 that occludes the wall 416 and all other real objects of the scene. In various implementations, the obfuscation area that occupies the entire display is a masking region, blurring region, dimming region, or portal region.

In various implementations, displaying the CGR environment includes displaying, on the display, a representation of the scene. Various focal conflict resolutions can be performed on a device with an opaque display. For example, applying a blurring region can be performed on a device with an opaque display by displaying a representation of the scene blurred in the blurring region. Further, various focal conflict resolutions can be performed on a device with a transparent display. For example, displaying a masking region can be performed on a device with a transparent display by displaying the masking region surrounding the virtual object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more processors, an image sensor, non-transitory memory, and a display:
   capturing, using the image sensor, an image of a scene including a real object; and
   displaying, on the display, a computer-generated reality (CGR) environment including a virtual object moving through the real object from a first location in the CGR environment closer to the device than the real object to a second location in the CGR environment further from the device than the real object;
   wherein, in accordance with a determination that the virtual object has not moved through the real object further from the device than the real object, the CGR environment includes the virtual object overlaid on the scene; and
   wherein, in accordance with a determination that the virtual object has moved through the real object further from the device than the real object, the CGR environment includes the virtual object with an obfuscation area surrounding the virtual object that obfuscates at least a portion of the real object within the obfuscation area.

2. The method of claim 1, wherein the obfuscation area includes a blurring region that blurs the portion of the real object within the blurring region.

3. The method of claim 1, wherein the obfuscation area includes a dimming region that dims the portion of the real object within the dimming region.

4. The method of claim 1, wherein the obfuscation area includes a masking region that occludes the portion of the real object within the masking region.

5. The method of claim 1, wherein the obfuscation area includes a portal region that displays a virtual world over the portion of the real object within the portal region.

6. The method of claim 5, wherein the virtual world includes a virtual floor.

7. The method of claim 6, wherein the virtual floor is coplanar with a real floor of the scene.

8. The method of claim 6, further comprising displaying a virtual shadow of the virtual object on the virtual floor.

9. The method of claim 1, wherein the obfuscation area occupies the entire display except for the virtual object.

10. The method of claim 1, wherein displaying the CGR environment includes displaying, on the display, a representation of the scene.

11. An electronic device comprising:
    an image sensor;
    a display;
    a non-transitory memory; and
    one or more processors to:
    capture, using the image sensor, an image of a scene including a real object; and
    display, on the display, a computer-generated reality (CGR) environment including a virtual object moving through the real object from a first location in the CGR environment closer to the device than the real object to a second location in the CGR environment further from the device than the real object;
    wherein, in accordance with a determination that the virtual object has not moved through the real object further from the device than the real object, the CGR environment includes the virtual object overlaid on the scene; and
    wherein, in accordance with a determination that the virtual object has moved through the real object further from then device than the real object, the CGR environment includes the virtual object with an obfuscation area surrounding the virtual object that obfuscates at least a portion of the real object within the obfuscation area.

12. The method of claim 1, wherein the virtual object represents a real object remote from CGR environment that correspondingly moves in the CGR environment when the real object remote from the CGR environment moves.

13. The method of claim 12, wherein the real object remote from the CGR environment is a person and the virtual object is an avatar.

14. The electronic device of claim 11, wherein the obfuscation area includes a blurring region that blurs the portion of the real object within the blurring region.

15. The electronic device of claim 11, wherein the obfuscation area includes a dimming region that dims the portion of the real object within the dimming region.

16. The electronic device of claim 11, wherein the obfuscation area includes a masking region that occludes the portion of the real object within the masking region.

17. The electronic device of claim 11, wherein the obfuscation area includes a portal region that displays a virtual world over the portion of the real object within the portal region.

18. The electronic device of claim 17, wherein the virtual world includes a virtual floor that is coplanar with a real floor of the scene.

19. The electronic device of claim 11, wherein the obfuscation area occupies the entire display except for the virtual object.

20. A non-transitory memory storing one or more programs, which, when executed by one or more processors of a device with an image sensor and a display cause the device to:
    capture, using the image sensor, an image of a scene including a real object; and display, on the display, a computer-generated reality (CGR) environment including a virtual object moving through the real object from a first location in the CGR environment closer to the device than the real object to a second location in the CGR environment further from the device than the real object;

wherein, in accordance with a determination that the virtual object has not moved through the real object further from the device than the real object, the CGR environment includes the virtual object overlaid on the scene; and wherein, in accordance with a determination that the virtual object has moved through the real object further from then device than the real object, the CGR environment includes the virtual object with an obfuscation area surrounding the virtual object that obfuscates at least a portion of the real object within the obfuscation area.

* * * * *